United States Patent [19]
Shin et al.

[11] Patent Number: 5,863,423
[45] Date of Patent: Jan. 26, 1999

[54] FILTER FOR A WASHING MACHINE

[75] Inventors: Jung-soo Shin; Ki-pyo Ahn, both of Suwon, Rep. of Korea

[73] Assignee: Samsung Electronics Co., Ltd., Suwon, Rep. of Korea

[21] Appl. No.: 28,523

[22] Filed: Feb. 24, 1998

[30] Foreign Application Priority Data

Aug. 16, 1997 [KR] Rep. of Korea ................. 97-39038
Aug. 16, 1997 [KR] Rep. of Korea ................. 97-39044

[51] Int. Cl.⁶ .................. D06F 39/10; B01D 29/35; B01D 35/153; B01D 35/22
[52] U.S. Cl. ................. 210/167; 210/196; 210/238; 210/136; 210/346; 68/18 F
[58] Field of Search .................... 210/136, 238, 210/346, 167, 196; 68/18 F

[56] References Cited

U.S. PATENT DOCUMENTS

| | | |
|---|---|---|
| 2,939,305 | 6/1960 | Snyder . |
| 3,626,728 | 12/1971 | Traube . |
| 5,509,283 | 4/1996 | Lee . |
| 5,661,989 | 9/1997 | Jean . |

FOREIGN PATENT DOCUMENTS

| | | |
|---|---|---|
| 62-14896 | 1/1987 | Japan . |
| 1-230394 | 9/1989 | Japan . |
| 3-103296 | 4/1991 | Japan . |
| 4-285595 | 10/1992 | Japan . |

Primary Examiner—Thomas M. Lithgow
Attorney, Agent, or Firm—Burns, Doane, Swecker Mathis, L.L.P.

[57] ABSTRACT

A filter for a washing machine is disclosed. The filter includes a waterfall discharging portion. The waterfall discharging portion has a penetrating hole formed at upper portion of a front panel of a pocket type filter and discharges the washing water introduced via a guide passage into the interior of a dehydrating tub. The waterfall discharging portion includes a first protrusion protruded from lower portion of the penetrating hole having a semi-spherical shape and a second protrusion extended from rear upper portion of the penetrating hole. Accordingly, a part of the washing water discharged from the pocket type filter is guided upwardly by the guide passage and discharged into the interior of the dehydrating tub to strike the laundry in the dehydrating tub after the flow speed of the washing water is increased by the first and second protrusions. The washing efficiency against the laundry is enhanced.

3 Claims, 7 Drawing Sheets

FILTER FOR A WASHING MACHINE

RELATED INVENTION

This invention is related to inventions disclosed in commonly filed U.S. Ser. Nos. 09/028,522, 09/028,354, 09/028,526, 09/028,668, and 09/028,670, the disclosures of which are incorporated by reference herein.

BACKGROUND OF THE INVENTION

1. Field of the Invention

The present invention relates to a washing machine, and more particularly to a filter for a washing machine for filtering foreign matters such as fluff from washing water.

2. Description of the Prior Art

FIG. 1 illustrates a conventional washing machine. Referring to FIG. 1, in the conventional washing machine, a washing tub 120 is suspended by a suspension 130 into inside of a case 110.

A dehydrating tub 170 and a pulsator (or an agitator; hereinafter refer to "a pulsator") 180 selectively driven by a clutch assembly 160 which is connected to a motor 150 by means of a belt 140, are disposed in the inner side of washing tub 120.

An impeller 182 as a pump is integrally formed to the lower side of pulsator 180, and a filter 190 is provided around the upper end of dehydrating tub 170. A guide portion 172 for guiding the washing water pumped by impeller 182 toward filter 190 is formed between impeller 182 and filter 190.

In the washing machine constructed as above, once pulsator 180 is rotated by motor 150 and clutch assembly 160 during a washing or rinsing cycle, the washing water pumped by impeller 182 at the lower portion of pulsator 180 is guided to filter 190 along guide portion 172 to be dropped into the interior of dehydrating tub 170 via filter 190. During this process, foreign matters intermingled in the washing water are filtered by filter 190.

However, according to the conventional washing machine constructed as above, filter 190 is arranged around the upper end of dehydrating tub 170. For this reason, when a small amount of articles is washed in a small quantity of cleaning water, the washing water cannot reach filter 190. That is, the foreign matters intermingled in the washing water cannot be sufficiently filtered by filter 190 to lower washing efficiency.

FIGS. 2 to 4 show other example of a filter for a washing machine proposed to overcome the above described problems as a example.

As illustrated, the filter for a washing machine is attached to the inner lower portion of dehydrating tub 170, which includes a filter case 300 and a pocket type filter 200 for filtering fluff by being inserted into filter case 300.

Filter case 300 is attached to the inner lower portion of dehydrating tub 170 to form a predetermined space with dehydrating tub 170, which includes an attachment portion 310 for attaching itself onto dehydrating tub 170, a front plane portion 320 formed with a plurality of discharging holes 322 and inserting guide portions 330 formed to both rear sides of front plane portion 320 while having the upper portion opened.

Pocket type filter 200 includes a front panel 210, a rear panel 230 and a check valve 250. Front panel 210 and rear panel 230 are coupled to be opened/closed by a hinge shaft 232 formed to rear panel 230, and attached with mesh nets 220 and 240 for filtering the fluff. Check valve 250 for opening/closing the space between front panel 210 and rear panel 230, is fixed to the lower side of rear panel 230 and made of a material such as a rubber.

Pocket type filter 200 as described above is inserted into the interior of the space between filter case 300 and dehydrating tub 170 by being slidably moved along inserting guide portions 330 from the upper portion of inserting guide portions 330 of filter case 300.

According to the filter as described above, the washing water pumped by impeller 182 flows into pocket type filter 200 via the space between dehydrating tub 170 and filter case 300 during the washing or rinsing cycle. Check valve 250 is upwardly pushed away by means of the washing water thereby the washing water is introduced into the interior of pocket type filter 200.

The washing water introduced into inside of pocket type filter 200 is discharged into dehydrating tub 170 via mesh nets 220 and 240 of front panel 210 and rear panel 230. At this time, the fluff within the washing water is filtered by mesh nets 220 and 240 attached to the front panel 210 and rear panel 230. Also, the washing water exhausted out of pocket type filter 200 is discharged into the interior of dehydrating tub 170 via discharging holes 322 formed in front plane portion 320 of filter case 300.

Under the state that the rotation of a pulsator is stopped after completing the washing or rinsing cycle, check valve 250 returns to its original position by means of gravity. Consequently, the filtered fluff is accumulated into the interior of pocket type filter 200 without getting away from pocket type filter 200.

The fluff accumulated on the interior of pocket type filter 200 is closely attached toward rear panel 230 due to a centrifugal force exerting upon the fluff by dehydrating tub 170 which is rotated at high speed during a dehydrating cycle. By doing so, the washing water pumped by impeller 182 can be easily introduced into pocket type filter 200 during the initial period of the next washing or rinsing cycle.

Meanwhile, as the amount of the fluff accumulated within pocket type filter 200 is increased, user grasps the upper portion of the pocket type filter and moved pocket type filter 200 in upper direction along inserting guide 230 of the filter case so as to separating pocket type filter 200 from the space between filter case 300 and dehydrating tub 170, then opens pocket type filter 200 and removes the fluff.

However, according to the filter of the prior art, there are drawbacks as followed.

As shown in FIG. 1, the washing water is fallen down toward pulsator 180 in dehydrating tub 170 from nearby the upper end of dehydrating tub 170 and the potential energy is high. Thus, the washing water is discharged into dehydrating tub 170 through filter 190, fallen down toward the laundry within dehydrating tub 170, and strikes the laundry so that may enhance the washing effect of a washing machine. Hereinafter, the washing water to be fallen down toward the laundry is referred to "a waterfall".

However, according to the filter of the other example of the prior art as shown in FIGS. 2 to 4, the kinetic energy of the washing water which is discharged into dehydrating tub 170 via pocket type filter 200, is reduced during passing through mesh nets 220 and 240 of front panel 210 and rear panel 230. Since the discharging position of the washing water into dehydrating tub 170 is low, the potential energy of the washing water is low. Thus, there are disadvantages that the washing water discharged through pocket type filter 200 does not form the waterfall and the washing water is not hoped for enhancing washing effect of the laundry within dehydrating rub 170.

SUMMARY OF THE INVENTION

Therefore, it is an object of the present invention to provide a filter for a washing machine capable of improving washing efficiency against the laundry by making a waterfall.

To achieve the object, the present invention provides a filter for a washing machine comprising a filter case attached to an inner lower portion of a dehydrating tub of the washing machine for forming a predetermined space with the dehydrating tub, including an attachment portion for being attached to the dehydrating tub and a filter receiving portion formed with an opening portion, and a pocket type filter including a front panel attached with a mesh net to one side thereof and formed with a penetrating hole at upper portion thereof for filtering fluff intermingled in washing water, a rear panel for forming a predetermined space with the front panel by being coupled to the front panel by hinge shafts to be opened/closed while being attached with a mesh net for filtering the fluff intermingled in the washing water to one side thereof, a check valve fixed to the lower side of the rear panel for confining the flow of the washing water introduced into the space between the front panel and the rear panel, and a waterfall discharging portion for changing a portion of the washing water introduced into between the front panel and the rear panel into waterfall and discharging the waterfall into the interior of the dehydrating tub, the pocket type filter being inserted into the filter receiving portion.

Preferably, a guide passage is formed between the rear panel and the dehydrating tub. The washing water which is introduced along a guide passage and discharged into the interior of the dehydrating tub by the waterfall discharging portion.

The waterfall discharging portion includes a first protrusion being protruded from lower portion of the penetrating hole and having a semi-spherical shape and a second protrusion being extended downwardly from upper portion of the penetrating hole.

According to the present invention, a part of the washing water discharged from the pocket type filter is guided upwardly by the guide passage and discharged into the interior of the dehydrating tub to strike the laundry in the dehydrating tub after the flow speed of the washing water is increased by the first and second protrusions. The washing efficiency against the laundry is enhanced.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
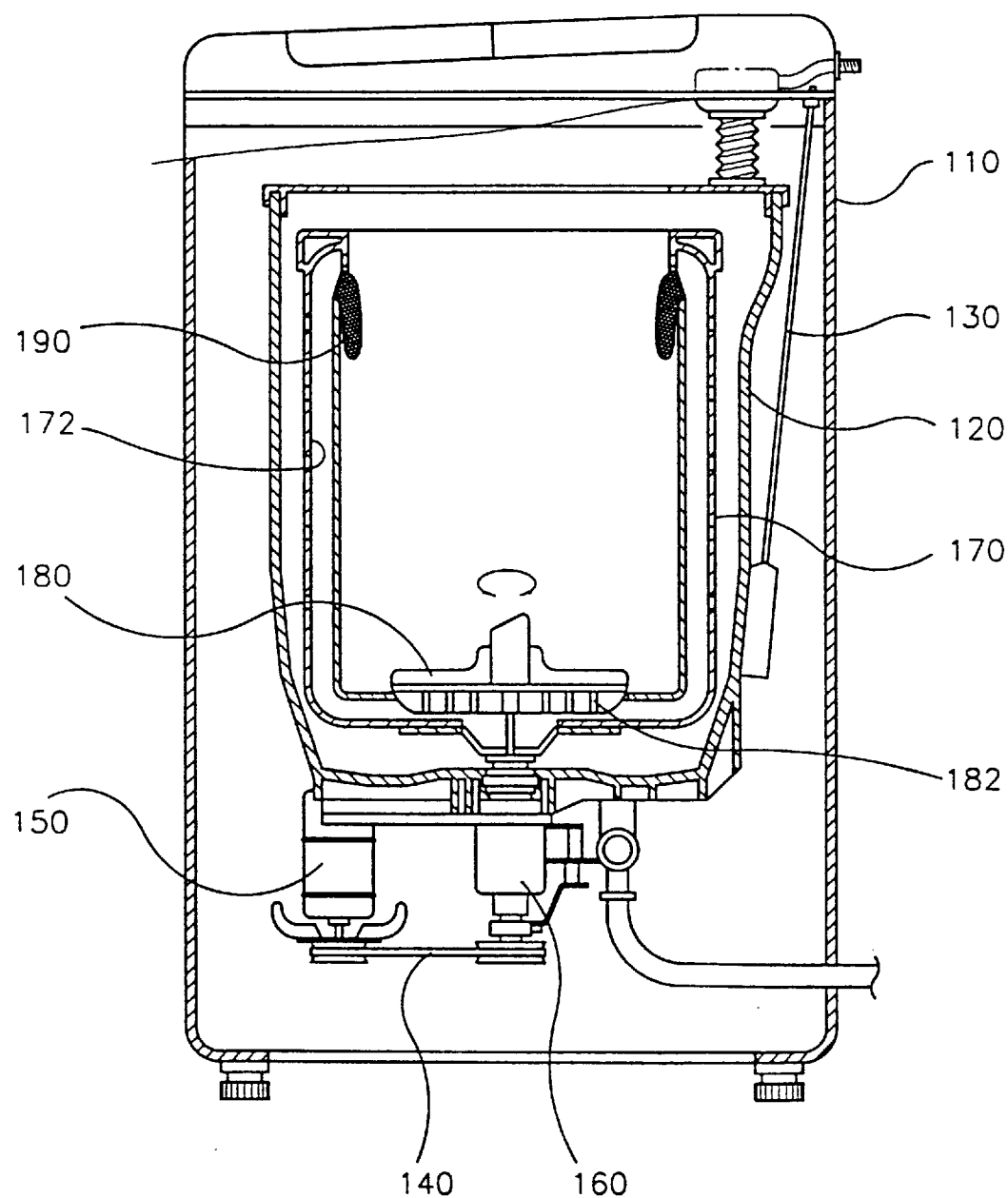
FIG. 1 is a sectional view showing a general full automatic washing machine having a filter.
Figure 2:
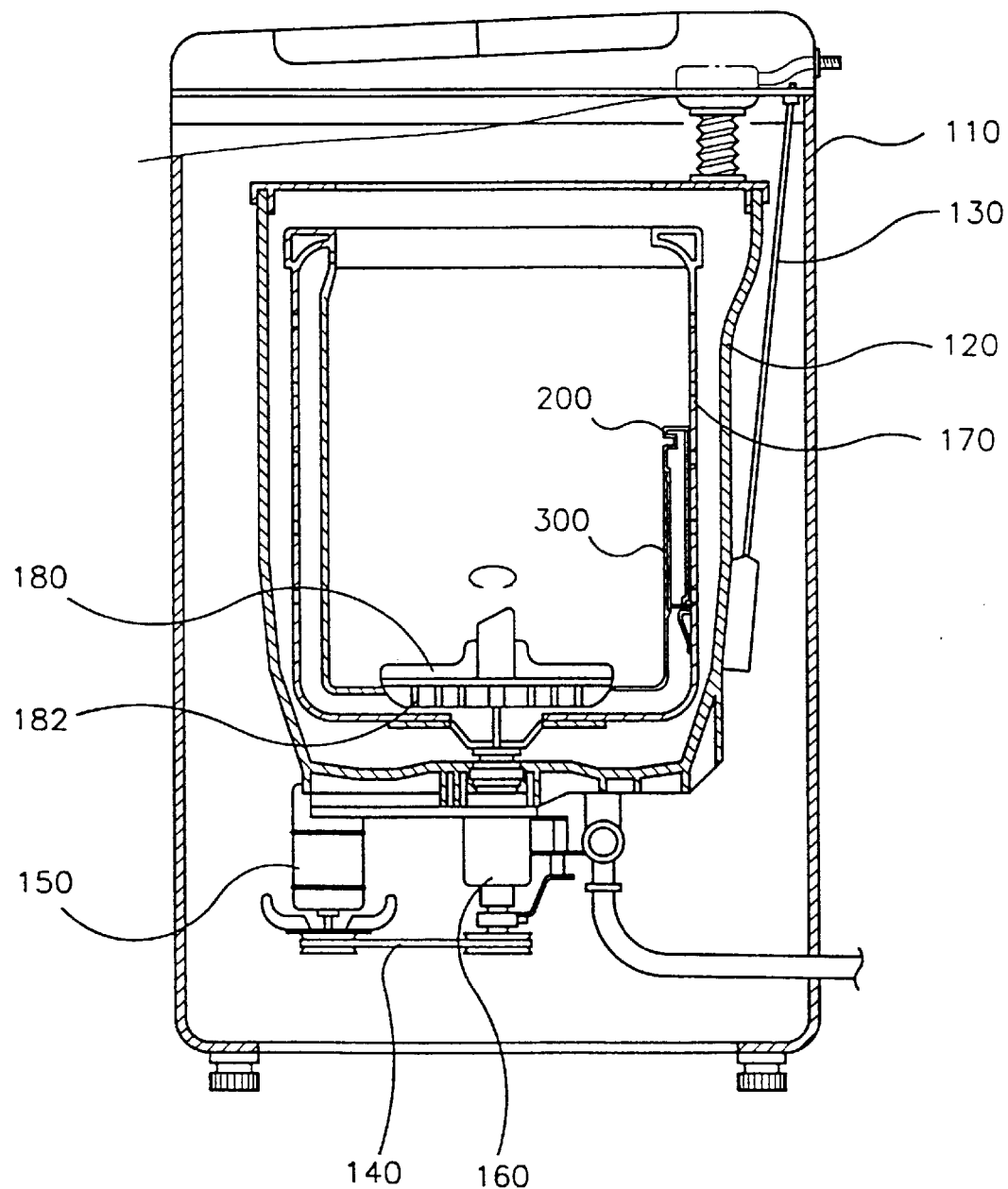
FIG. 2 is a sectional view showing other general full automatic washing machine having a filter.
Figure 3:
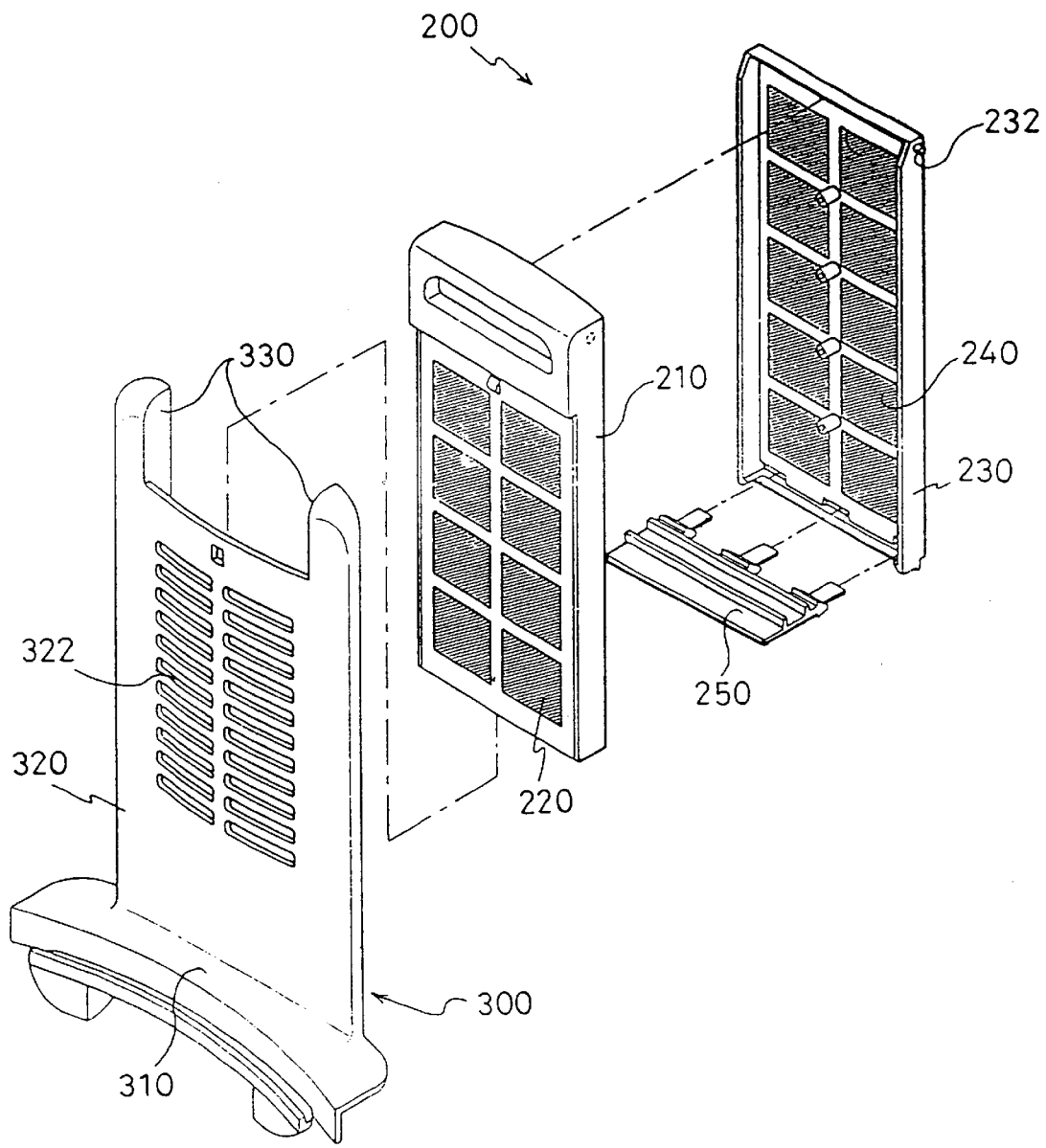
FIG. 3 is an exploded perspective view of the filter shown in FIG. 2.
Figure 4:
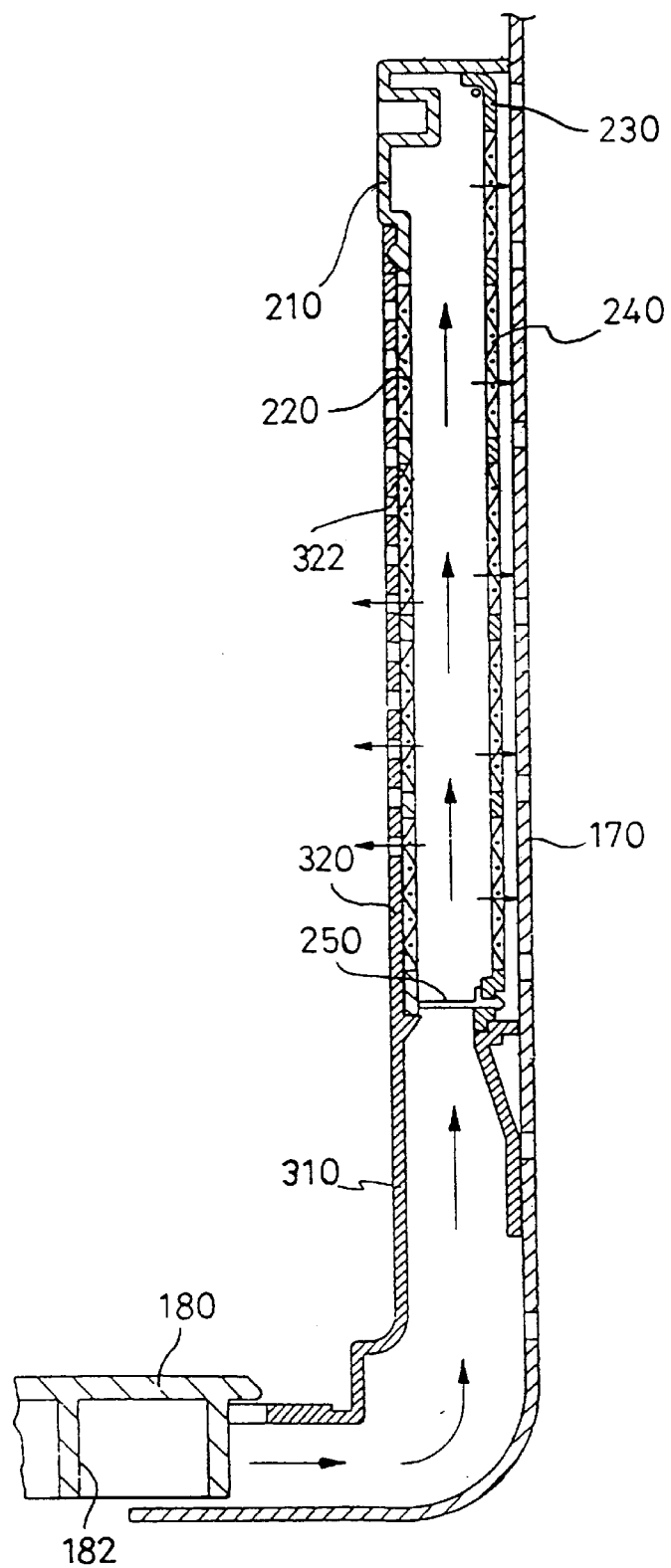
FIG. 4 is a detailed sectional view showing the portion shown in FIG. 2 where the filter for a washing machine is mounted.
Figure 5:
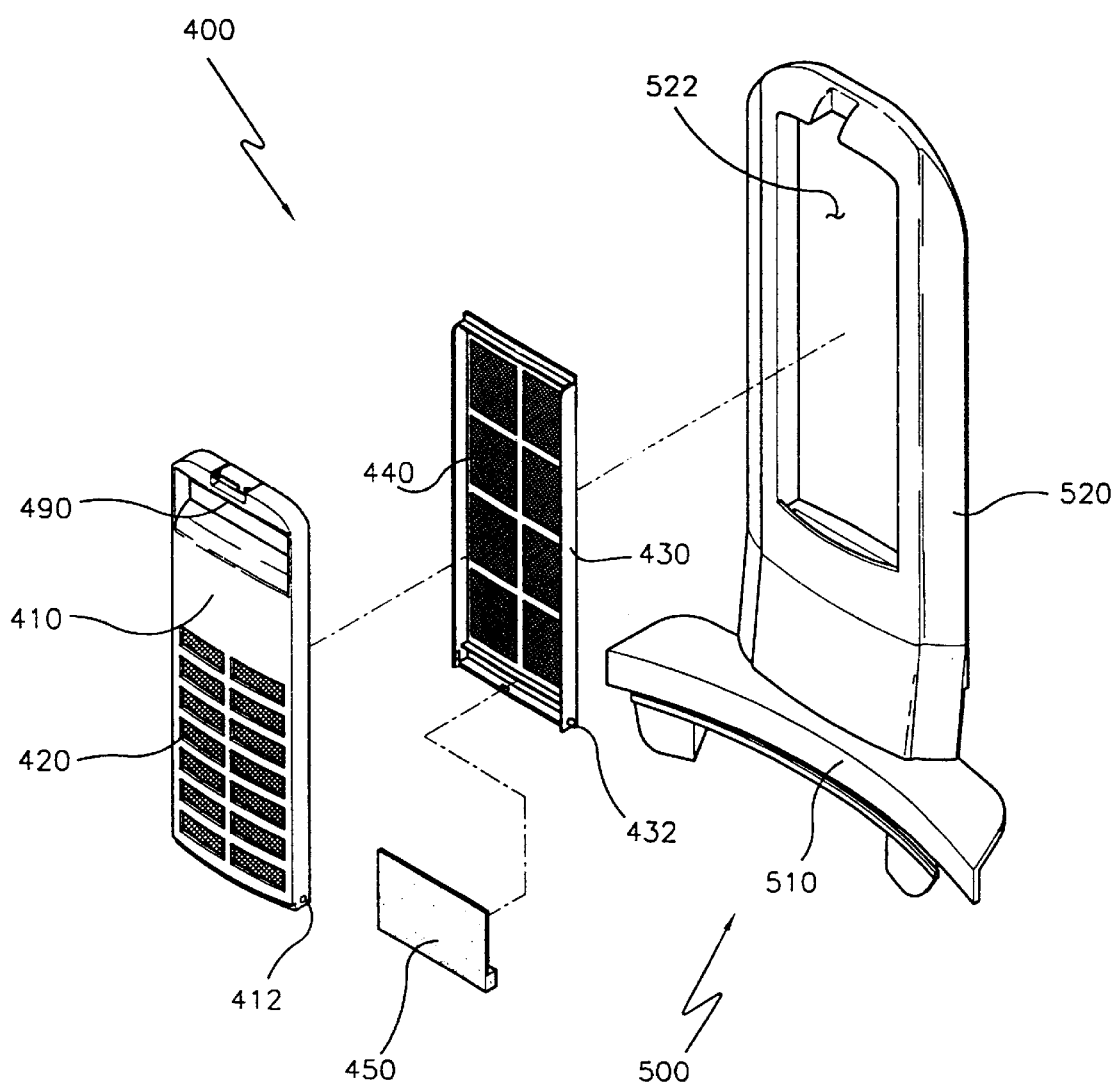
FIG. 5 is an exploded perspective view showing a filter for a washing machine according to the present invention.
Figure 6A:
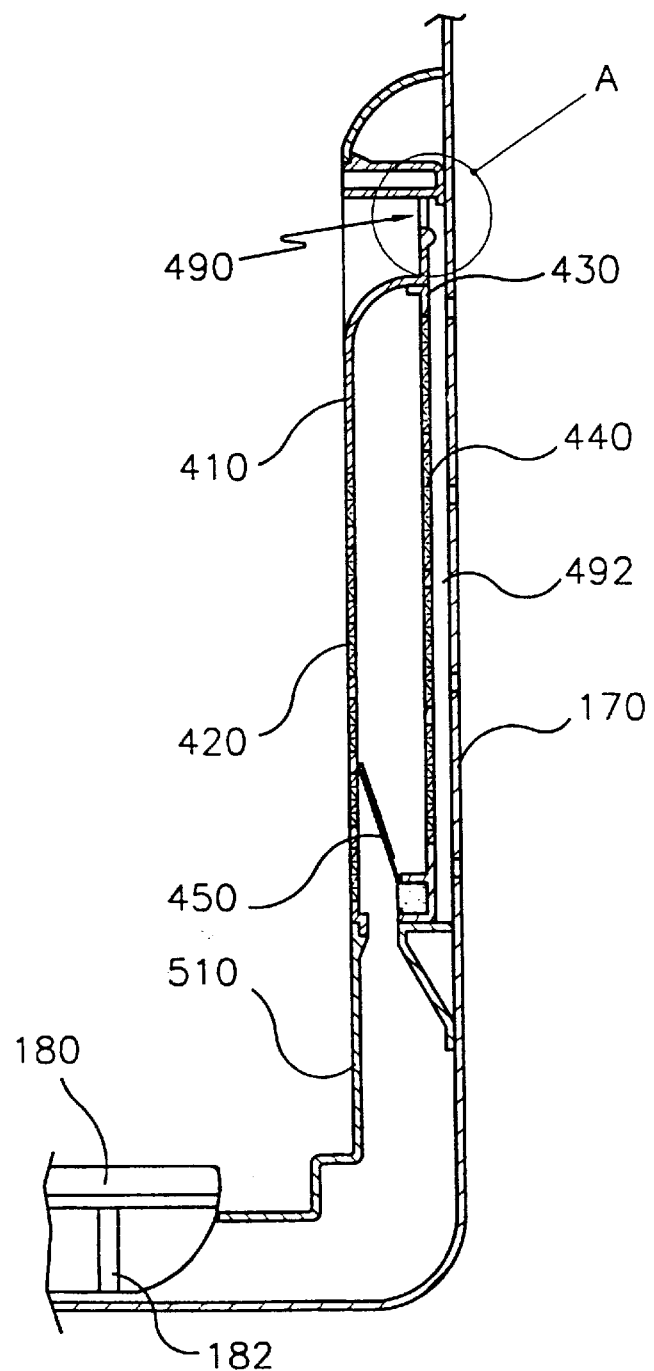
FIG. 6A is a sectional view showing a state that the filter for a washing machine in FIG. 5 attached to a washing machine.
Figure 6B:
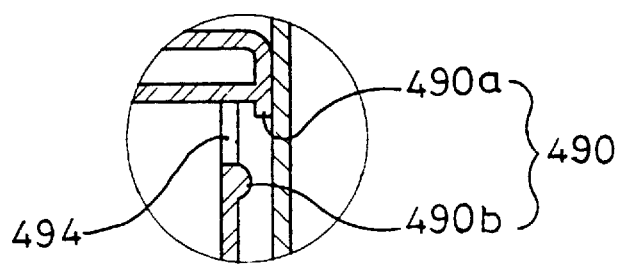
FIG. 6B is an enlarged sectional view of portion A in FIG. 6A.

A filter according to a preferred embodiment of the present invention is shown in FIGS. 5 to 6B.

As illustrated, a filter for a washing machine according to the present invention is attached to the inner lower portion of a dehydrating tub 170, which includes a filter case 500 and a pocket type filter 400 for filtering fluff by being inserted into filter case 500.

Filter case 500 includes an attachment portion 510 for attaching itself onto dehydrating tub 170 and a filter receiving portion 520 formed with an opening 522 into which pocket type filter 400 is inserted from preceding side thereof.

Pocket type filter 400 includes a front panel 410, a rear panel 430, a check valve 450, and a waterfall discharging portion 490. Waterfall discharging portion 490 changes the washing water exhausted through mesh net 440 of rear panel 430 into waterfall and discharges the waterfall into the interior of dehydrating tub 170. Front panel 410 and rear panel 430 are coupled to be opened/closed by a hinge shaft 432 formed to rear panel 430, and attached with mesh nets 420 and 440 for filtering the fluff respectively. Front panel 410 is formed with a penetrating hole 494 at upper portion thereof.

As shown in FIG. 6B, waterfall discharging portion 490 is integrally formed to the upper portion of front panel 410 and has a first and second protrusions 490*a* and 490*b*. First protrusion 490*a* is formed at lower portion of penetrating hole 494 and has a semispherical shape and second protrusion 490*b* is extended from rear upper end of penetrating hole 494. In addition, a guide passage 492 is provided between rear panel 430 and dehydrating tub 170. The washing water passed through mesh net 440 of rear panel 430 is guided to waterfall discharging portion 490 by guide passage 492.

Check valve 450 for opening/closing the space between front panel 410 and rear panel 430, is fixed to the lower side of rear panel 430 and made of a material such as a rubber.

Pocket type filter 400 is inserted into opening 522 from preceding side of filter case 500 and then accommodated in filter receiving portion 520.

Since the operation of the filter for a washing machine according to the present invention is same to the operation of the other example of the prior art, the description of the operation is abbreviated.

According to the present invention as described above, the washing water discharged via mesh net 420 of front panel 410 is directly exhausted into the interior of dehydrating tub 170. Meanwhile, the washing water passed through mesh net 440 of rear panel 430 is guided to be introduced to waterfall discharging portion 490 by guide passage 492 so that discharged toward the pulsator in dehydrating tub 170 via penetrating hole 494.

At this time, the washing water which is guided to waterfall discharging portion 490 is accelerated by first and second protrusions 490*a* and 490*b*, thus the kinetic energy of the washing water is increased. Since waterfall discharging portion 490 is located at the upper portion of front panel 410, the potential energy of the washing water is also increased.

Accordingly, the washing water discharged from waterfall discharging portion 490 toward the pulsator in dehydrating tub 170 strongly strikes the laundry so that the washing efficiency against the laundry may be enhanced.

According to the present invention as described in detail, a part of the washing water discharged from the pocket type filter is guided upwardly by the guide passage and discharged into the interior of the dehydrating tub to strike the laundry in the dehydrating tub after the flow speed of the washing water is increased. The washing efficiency against the laundry is enhanced.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A filter apparatus for a washing machine comprising:
   a filter case attached to an inner lower portion of a dehydrating tub of the washing machine for forming a predetermined space with the dehydrating tub, including an attachment portion for being attached to the dehydrating tub and a filter receiving portion formed with an opening portion; and
   a pocket filter including a front panel attached with a mesh net to one side thereof for filtering fluff intermingled in washing water, a rear panel for forming a predetermined space with the front panel by being coupled to the front panel by hinge shafts for opening and/or closing said pocket filter, said rear panel further including a mesh net for filtering the fluff intermingled in the washing water, a check valve fixed to the lower side of the rear panel for confining the flow of the washing water introduced into the space between the front panel and the rear panel, said pocket filter further formed with a penetrating hole at an upper portion thereof and a waterfall discharging portion for changing a portion of the washing water introduced into between the front panel and the rear panel into waterfall and discharging the waterfall from the penetrating hole into the interior of the dehydrating tub, the pocket filter being inserted into the filter receiving portion.

2. The filter apparatus for a washing machine as claimed in claim 1, wherein the waterfall discharging portion discharges the washing water which is introduced along a guide passage into the interior of the dehydrating tub, the guide passage is formed between the rear panel and the dehydrating tub.

3. The filter apparatus for a washing machine as claimed in claim 2, wherein the waterfall discharging portion includes a first protrusion being protruded from lower portion of the penetrating hole and having a semi-spherical shape and a second protrusion being extended downwardly from upper portion of the penetrating hole.

* * * * *